United States Patent Office 3,429,954
Patented Feb. 25, 1969

3,429,954
METHOD OF MAKING A
POLYMER-LINED PIPE
Bobby L. Atkins and Billy G. Harper, Lake Jackson, Tex., assignors to The Dow Chemical Company, Midland, Mich., a corporation of Delaware
No Drawing. Filed Mar. 22, 1965, Ser. No. 441,837
U.S. Cl. 264—22                                8 Claims
Int. Cl. B32b 1/08, 31/12

ABSTRACT OF THE DISCLOSURE

A tubular article such as a pipe is provided with a strongly adhering liner of a thermoplastic material such as a copolymer of ethylene and acrylic acid by irradiating a tube of said thermoplastic material to crosslink the thermoplastic polymer material, heating the irradiated tube to soften the thermoplastic material, stretching the softened tube longitudinally to reduce the diameter thereof to a size less than the inner diameter of the tubular article, cooling the stretched tube while it is maintained in its stretched condition to preserve the size and shape thereof, placing the stretched tube inside of the tubular article, and applying sufficient heat to the tube to allow it to expand and thereby form a tightly adhering bond with the interior surface of the article. In one embodiment, the tube of thermoplastic is provided with a coating of an adhesive material such as a copolymer of ethylene and acrylic acid to further improve the bond with the tubular article.

This invention relates to a method for lining tubular structures and more particularly it relates to a method for producing polymer-lined tubular structures such as pipes.

These are many types of fluids which are so corrosive or so abrasive that they cannot be handled satisfactorily in metal or ceramic pipes. To overcome this difficulty, metal and other rigid pipes have been lined with rubber or with various plastic materials which are resistant to attack by the fluids which it is desired to convey through the pipes. The organic liner protects the pipe and the pipe gives rigidity to the liner.

Many of the methods employed for making lined pipe of the suggested type require special and expensive equipment, and can only be carried out successfully in pipe factories or in special shops which may be distant from the point of use of the finished product.

Lined pipe and methods for lining pipe with a plastic lining are known in the art. One such method is described in U.S. Patent No. 2,027,961. A tube or liner of vinyl chloride-vinyl acetate copolymer, while still hot, is placed within an iron pipe and then compressed air is supplied to one end of the liner while the other end is plugged. Pressure of about five to ten pounds per square inch forces the liner outwardly against the interior of the pipe. The pressure is maintained while the tube is heated to a temperature of about 110° C. for about fifteen minutes to insure transition of the copolymer through its heat unstable condition to a heat stable condition. If such transition is not permitted to occur, the patent cautions that the lining will tend to loosen from the pipe when its temperature is raised.

In accordance with the present invention. a method for producing polymer-lined pipe comprises (1) inserting into a pipe, a longitudinally oriented, heat-shrinkable, irradiated, thermoplastic polymer tubing, said tubing in the unoriented state having an outer diameter greater than the internal diameter of said pipe, but slightly smaller than the internal diameter when oriented and (2) heating said tubing to a temperature above the crystalline melting point of the polymer to longitudinally shrink the polymer tubing and causing it to expand radially and fit tightly against the internal wall of the pipe.

The olefin polymer tubings employed as pipe linings in the present invention are subjected to radiation to crosslink the polymer and give the tubing its "memory" effect. The tubing is heated, stretched and cooled while in a stretched state. Upon cooling, the polymer crystallizes causing the molecules to become locked in their new position. When the tubing is reheated to a temperature above its crystalline melting point, the crystallites melt and the crosslinks present in the polymer cause the stretched tubing to try to return to its original shape. Therefore, in this particular invention, since the outer diameter of the tubing is larger than the inner diameter of the pipe to be lined, when the tubing is longitudinally shrunk, a tight fit is obtained between the tubing and the internal surface of the pipe.

Polymers which can be employed as linings in the present invention are any polymer which can be irradiated, heated, oriented, cooled and heated again to shrink the polymer to its original size. Specific examples include homopolymers such as polyethylene, polypropylene, polybutene; copolymers of ethylene and vinyl esters of aliphatic carboxylic acids such as vinyl acetate and vinyl propionate; copolymers of ethylene and alkyl acrylate and methyl methacrylate; copolymers of ethylene and other α-olefins such as propylene and butene; copolymers of ethylene and ethylenically unsaturated carboxylic acids such as acrylic acid, methacrylic acid and the like.

The irradiation of the polymer tubing may be carried out with any means capable of generating high energy particles. Therefore, gamma rays from cobalt 60, X-rays, beta rays and electrons may be used. It has been found that radiation doses of from about 2 to about 60 megarads and preferably from about 2 to about 20 megarads produce tubing with the most desirable shrink properties.

Temperatures employed in stretching the polymer tubing should be sufficient to soften the tubing and permit longitudinal stretching of said tubing to produce a resulting polymer tubing having an outer diameter less than the inner diameter of the pipe to be lined. Favorable temperatures are in the range of from about 70° C. to about 200° C.

After the irradiated, longitudinally stretched tubing is placed inside the pipe to be lined, the assembly is heated to a temperature of from about 70° C. to about 300° C. to longitudinally shrink the tubing firmly against the inner wall of the pipe. Where large pipes are to be lined with the polymer tubing, it may be desirable, during the fabrication process, to employ a method of subjecting the inner portion of the pipe to pressure to force the polymer tubing outwardly against the inner surface of the pipes to hold the tubing in place until the polymer-pipe bond has been effected.

Non-adhesive polymers employed as pipe linings such as polyethylene can be coated with an adhesive material such as a copolymer of ethylene and an ethylenically unsaturated carboxylic acid, e.g. ethylene and acrylic acid, to obtain a strong adhesive bond between the polymer lining and the inner wall of the pipe. The adhesive material can be applied in the form of a thin film, flowable liquid, powder or the like. The heat applied to shrink the polymer lining should also be sufficient to promote adequate bonding between the lining and the pipe.

The radiation employed to crosslink the polymer can also be employed to graft polymerize an adhesive monomer to the surface of the tubing, e.g., after irradiation, passing the tubing through a solution containing acrylic acid, ethyl acrylate or vinyl acetate. Alternatively, the tubing can be treated by applying a powdered adhesive, e.g., a copolymer of ethylene and acrylic acid, to the outer surface thereof during heating and stretching steps prior to cooling. The adhesive material is either mechanically embedded into the soft surface of the hot tubing or melts and forms a thin adhesive film on the surface thereof.

In the following examples where the polymer-lined pipe was tested for bond strength or adhesion, the samples were prepared and tested by (1) longitudinally cutting in half the polymer-lined pipe (2) cutting a piece of the lining ¼-inch wide and anchoring the pipe so it could not move and (3) pulling the polymer lining in a direction 90° to the axial plane of the pipe. An Instron Tensile Testing machine was employed to measure the adhesion in pounds per inch of moving boundary between the pipe and lining.

The following examples are illustrative of the invention and are not intended to limit the scope thereof.

EXAMPLE 1

A polyethylene tubing having a ⅝″ outer diameter and a wall thickness of 1/16″ and length of 12″ was irradiated, using a 1 million electron volt beam generator operated at a beam current of 5 milliamperes, to a dose of 50 megarads. The polymer tubing was heated with hot air along its length to a temperature of 250–300° C. The tubing was stretched to a length of approximately 16″, thereby decreasing its diameter, and was cooled while under the stretching tension. It was then inserted into a standard ½″ steel electrical conduit pipe and heated along its entire length with hot air to a temperature of about 150° C. which caused the polymer tubing to shrink longitudinally and expand radially to form a tight-fitting liner on the inside of the steel conduit pipe.

EXAMPLES 2–6

The procedure of Example 1 was substantially repeated in Examples 2 through 6, except that other pieces of lined pipe were prepared using different radiation sources with varying degrees of irradiation. The results obtained were substantially the same as in Example 1.

| Example No. | Radiation source | Radiation dose (mrads) | Elongation of tubing (percent) |
|---|---|---|---|
| 2 | Cobalt-60 0.2 mrads/hr | 24 | 100 |
| 3 | Van der Graaf 2 mev. at 0.2 milliampere. | 40 | 25 |
| 4 | do | 30 | 50 |
| 5 | do | 20 | 265 |
| 6 | do | 10 | 368 |

EXAMPLE 7

Example 3 was substantially repeated except that a piece of pipe having a clean internal surface, obtained by sandblasting, was used. The pipe and lining assembly was subjected to a temperature of 130° C. by means of a hot propylene glycol bath to cause longitudinal shrinking and radial expansion of the polymer lining. In another test, a higher shrinking temperature of 185° C. was employed but the adhesion was not improved. The adhesion in each instance was about 26 pounds per inch.

EXAMPLE 8

The polymer tubing of Example 6 was surface-treated by dusting it with a powdered copolymer of ethylene and acrylic acid (8 percent acrylic acid). A thin, continuous coating of the copolymer was formed on and adhered to the surface of the tubing as it was heated and stretched. This surface-treated tubing was used to line a conduit pipe as in Example 1 except that the tubing was longitudinally shrunk and radially expanded by sealing the polymer-pipe assembly on one end and immersing it in a propylene glycol bath maintained at a temperature of 185 degrees C. Upon testing, the adhesion of the lining was found to be about 56 pounds per inch.

EXAMPLE 9

A five-foot section of ½″ outer diameter conduit, which was sandblasted on the inside, was lined with a surface-treated tubing similar to that employed in Example 8. The shrinking and expansion of the polymer tubing was accomplished by passing the polymer-pipe assembly through an electric furnace (heated to a temperature of about 250 degrees C.) at a rate of 0.25 feet per minute to uniformly heat the entire length of pipe.

A section of the above lined pipe was bent in a standard tubing bender to a 90 degree angle. The pipe was then sawed lengthwise through the bend and examined. The lining remained tightly adhered to the pipe and formed, with the pipe, a smooth continuous bend without evidence of cracking or breaking.

EXAMPLE 10

Polyethylene tubing of 15/16″ outer diameter and 0.075″ wall thickness and having a melt index of about 0.5 was irradiated with a 2 million-electron-volt Van der Graaf electron generator at 200 microampere beam current at a dose of 6 megarads. The tubing was heated to a temperature of about 120° C., stretched 92 percent beyond its original length and coated with a copolymer of ethylene and acrylic acid in the manner described in Example 8. The resulting tubing had an outer diameter of ⅝″ with a 0.060″ wall thickness. The polymer tubing was inserted into a ¾-inch thin-wall steel conduit pipe and said tubing was longitudinally shrunk and radially expanded according to the process as described in Example 9. The lining adhered strongly to the wall of the conduit even after bending to a 90 degree angle. The curvature of the bend was such that the surface of the pipe on the inside radius of the bend was rippled and the lining on the same section of pipe was likewise rippled without surface breaks or loosening from the pipe wall. The bond strength was tested and found to be 55 pounds per inch.

EXAMPLE 11

The procedure of Example 10 was substantially repeated except that a tubing comprising a copolymer of 8 percent acrylic acid and 92 percent ethylene, having a melt index of 5 and having a 1″ outer diameter and a wall thickness of 0.110″ was substituted for the polyethylene tubing. The tubing was heated to a temperature of about 130 degrees C. and stretched until the resulting tubing had a ⅝″ outer diameter and a wall thickness of 0.060″. The tubing was placed into a section of ¾″ conduit, and the conduit was heated in an electric furnace at a temperature of about 275 degrees C. to shrink and expand the tubing firmly against the inner wall of the conduit. The bond strength was tested and found to be 48 pounds per inch.

EXAMPLE 12

The procedure of Example 10 was substantially repeated except that the irradiated polymer tubing was comprised of a copolymer of about 85 percent by weight of ethylene and about 15 percent by weight vinyl acetate which had a melt index of about 10. This tubing, which had a wall thickness of about 66 mils and a 1 1/16″ O.D., was heated and stretched sufficiently to be inserted into a ¾″ I.D. steel conduit pipe. The assembly was heated in an electric furnace to a temperature of about 250 degrees C. which expanded the tubing within the conduit to form a firmly adherent lining inside the steel pipe.

EXAMPLE 13

The procedure of Example 12 was substantially repeated except that the copolymer used was comprised of about 70 percent ethylene and 30 percent ethyl acrylate and had a melt index of about 10. This tubing, which had a wall thickness of about 60 mils and a 1 1/16″ O.D., was heated and stretched sufficiently to be inserted into a ¾″ I.D. steel conduit pipe. Upon heating the assembly to about 250 degrees C., the polymer tubing expanded to form a firmly adherent lining inside the steel pipe.

In place of the particular polymers and radiation sources used in the foregoing examples, there can be used other polymers and radiation sources as hereinbefore described with advantageous results in making the polymer-lined pipes of the present invention.

What is claimed is:

1. A method for producing a polymer-lined pipe which comprises (1) inserting into a pipe a longitudinally oriented, heat-shrinkable, irradiated thermoplastic polymer tubing fabricated of a material selected from the group consisting of a copolymer of ethyene and a vinyl ester of an aliphatic carboxylic acid, a copolymer of ethylene and an alkyl acrylate, and a copolymer of ethylene and an ethylenically unsaturated carboxylic acid, said tubing in the unoriented state having an outer diameter greater than the internal diameter of said pipe, and after having been longitudinally oriented having an outer diameter less than the internal diameter of the pipe, and (2) heating said tubing to a temperature above the crystalline melting point of the polymer to shrink the tubing longitudinally and cause radial expansion thereof against the inner wall of the pipe.

2. The method according to claim 1 wherein the thermoplastic polymer tubing is a copolymer of ethylene and acrylic acid.

3. The method according to claim 1 wherein the thermoplastic polymer tubing is a copolymer of ethylene and vinyl acetate.

4. The method according to claim 1 wherein the thermoplastic polymer tubing is a copolymer of ethylene and ethyl acrylate.

5. The method according to claim 1 wherein the thermoplastic polymer tubing is irradiated with a radiation dose of from about 2 megarads to about 60 megarads.

6. A method for producing a polymer-lined pipe which comprises (1) irradiating a thermoplastic polymer tubing fabricated of a material selected from the group consisting of a copolymer of ethylene and a vinyl ester of an aliphatic carboxylic acid, a copolymer of ethylene and an alkyl acrylate, and a copolymer of ethylene and an ethylenically unsaturated carboxylic acid with a radiation dose of from about 2 megarads to about 60 megarads, said tubing having an outside diameter larger than the inside diameter of a pipe to be lined, (2) heating said irradiated tubing to a temperature above 70 degrees C., (3) stretching said irradiated and heated tubing in a longitudinal direction to reduce the outer diameter of said tubing to a size smaller than the inner diameter of the pipe to be lined, (4) cooling said irradiated and stretched tubing while under tension, (5) placing said tubing inside the pipe to be lined, and (6) heating the pipe and tubing assembly to a temperature above the crystalline melting point of the polymer, causing the tubing to shrink longitudinally and expand radially against the inside wall of the pipe.

7. A method for producing polymer-lined pipe which comprises (1) irradiating a polyethylene tubing with a radiation dose of from about 2 megarads to about 60 megarads, said tubing having an outside diameter larger than the inside diameter of the pipe to be lined, (2) heating said irradiated tubing to a temperature of at least 100° C., (3) stretching said irradiated and heated tubing in a longitudinal direction to reduce the outer diameter of said tubing to a size smaller than the inner diameter of the pipe to be lined, (4) coating said heated and stretched tubing with a layer of a copolymer of ethylene and acrylic acid, (5) cooling the resulting tubing while under tension, (6) placing said tubing inside the pipe to be lined, and (7) heating the pipe and tubing assembly to a temperature of about 120° C. to shrink longitudinally and expand radially the tubing against the inside wall of the pipe to allow said copolymer of ethylene and acrylic acid to form a strong bond between the pipe and the tubing.

8. A method for producing polymer-lined pipe which comprises (1) irradiating a tubing of a copolymer of ethylene and acrylic acid with a radiation dose of from about 2 megarads to about 60 megarads, said tubing having an outside diameter larger than the inside diameter of the pipe to be lined, (2) heating said irradiated tubing to a temperature of at least 100° C., (3) stretching said irradiated and heated tubing in a longitudinal direction to reduce the outer diameter of said tubing to a size smaller than the inner diameter of the pipe to be lined, (4) cooling the polymer tubing while under tension, (5) placing said tubing inside the pipe to be lined, and (6) heating the pipe and tubing assembly to a temperature of about 120° C. to shrink longitudinally and expand radially the tubing against the inside wall of the pipe.

References Cited

UNITED STATES PATENTS

| 3,056,171 | 10/1962 | Fite | 156—294 XR |
| 3,050,786 | 8/1962 | St. John et al. | 156—294 XR |
| 3,080,269 | 3/1963 | Pollock et al. | 156—294 XR |
| 3,297,819 | 1/1967 | Wetmore | 156—86 XR |

FOREIGN PATENTS 797,615    7/1958    Great Britain.

PHILIP DIER, *Primary Examiner.*

U.S. Cl. X.R.

156—86, 294; 264—230